(No Model.)

R. LOWE.
FEED WATER HEATER AND PURIFIER.

No. 558,502. Patented Apr. 21, 1896.

Witnesses.
A. Ruppert.
G. B. Towles

Inventor.
Robert Lowe,
Per
Thomas P. Simpson.
atty.

UNITED STATES PATENT OFFICE.

ROBERT LOWE, OF WASHINGTON, PENNSYLVANIA, ASSIGNOR OF ONE-HALF TO FREDERICK McKEE, OF SAME PLACE.

FEED-WATER HEATER AND PURIFIER.

SPECIFICATION forming part of Letters Patent No. 558,502, dated April 21, 1896.

Application filed September 21, 1895. Serial No. 563,165. (No model.)

*To all whom it may concern:*

Be it known that I, ROBERT LOWE, a citizen of the United States, residing at Washington, in the county of Washington and State of Pennsylvania, have invented certain new and useful Improvements in Feed-Water Heaters and Purifiers; and I do declare the following to be a full, clear, and exact description of the invention, such as will enable others skilled in the art to which it appertains to make and use the same, reference being had to the accompanying drawings, and to the letters of reference marked thereon, which form a part of this specification.

The invention relates to feed-water heaters and purifiers; and it consists in the improvements hereinafter described, the heating being done by steam.

Figure 1:
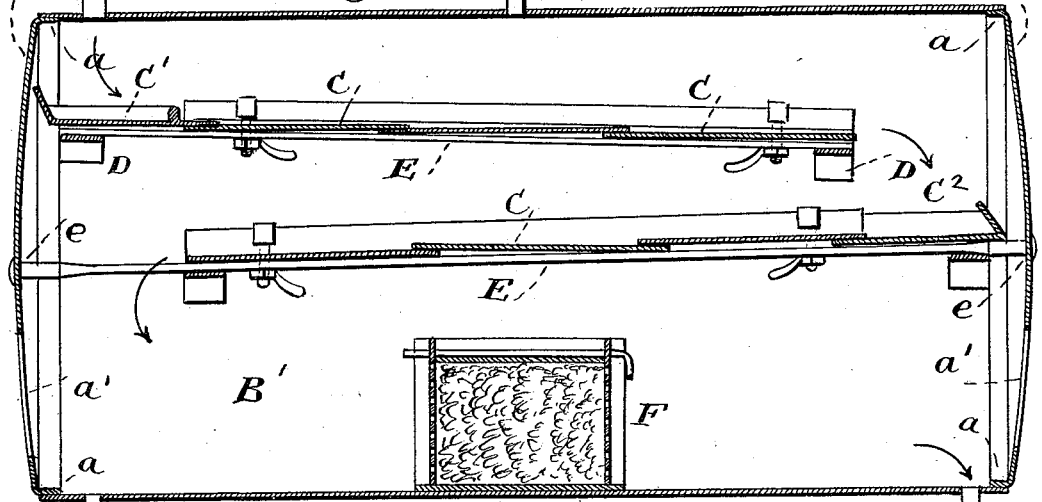
Figure 2:
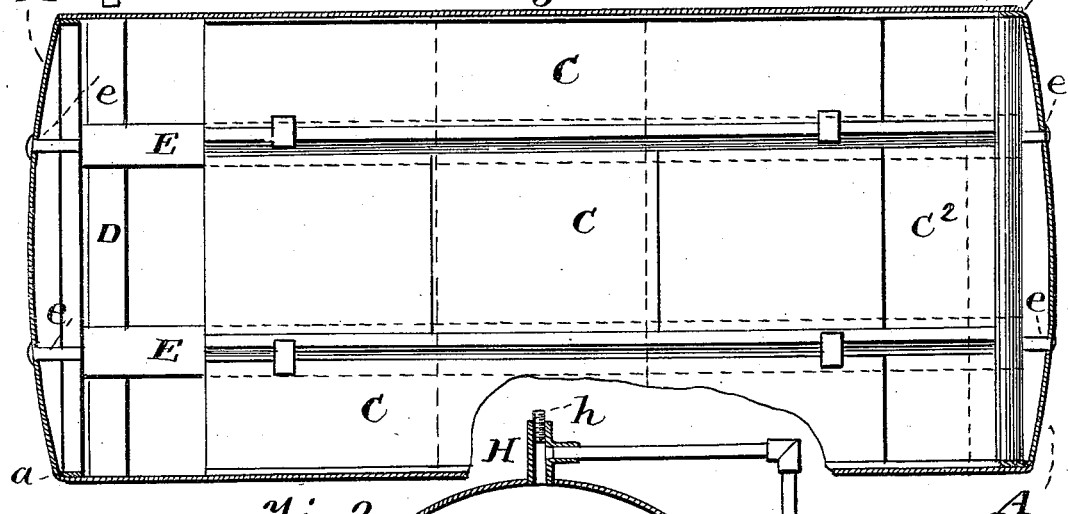
Figure 3:
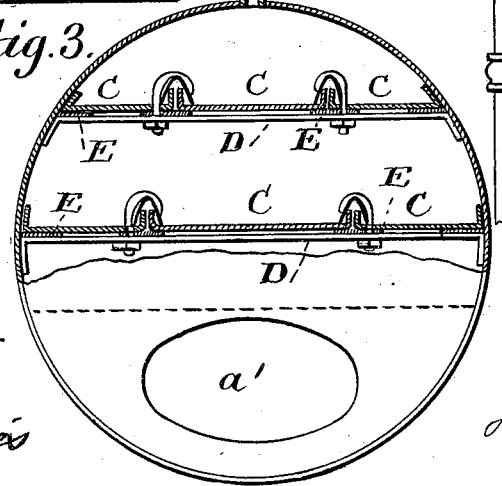

Figure 1 of the drawings is a longitudinal vertical section taken diametrically, Fig. 2 a horizontal section, and Fig. 3 an end elevation, of the purifier, partly in section.

In the drawings, A A represent the cylinder-heads, which are very heavy and difficult to handle when the troughs are to be cleaned. For this reason I make heads with the flange $a$, which overlaps the ends of the cylinder B, to which they are securely riveted. They are also each provided with the manhole $a'$, through which the troughs may be passed in and out of the cylinder. The upper and lower troughs are all supported on the cross-pieces D and the longitudinal plates E, the latter being extended out at each end in the form of a rivet $e$, which is passed through the heads A and riveted on the outside thereof. The upper floor of troughs is preceded by a pan $C'$, over which the water overflows into the troughs C, then passes down the length of the cylinder into the cross-plate or receptacle $C^2$, then back over the second flooring of troughs into the subjacent space $B'$, and finally through the filter F, when it is in a cleansed and purified condition ready for the boiler.

The middle section of the upper and lower troughs is made in three parts and are made detachable, so that they may be lifted out while the lateral section on each side is in one long trough whose joint with the middle one is covered by an inverted-V plate, which is held by a screw-hook and nut to the longitudinal plates E.

H is the water-supply pipe made in T form and provided with a screw-plug $h$ in one end to facilitate the keeping of it free from all obstructions.

I is the steam-entrance, J the blow-off pipe, and K a filter made of perforated sheet metal, the latter being provided with a detachable cover held by cross-rods or in any other suitable manner.

By the above-described improvements I not only eliminate all noxious ingredients from the water, but I provide ample means for keeping the troughs clean and enabling the charcoal or other filtering material to be replaced with little labor or loss of time.

It will be noted, as an important feature of my invention, that a person may take out the middle subsections of my troughs, so as to stand up between the side sections while he cleans the latter, thus saving much time and labor.

What I claim as new, and desire to protect by Letters Patent, is—

1. In a feed-water heater and purifier, the combination with the troughs of the cross-pieces D, longitudinal plates E, the inverted-V plates and the screw-hooks, to support said troughs in the manner described.

2. The troughs of a feed-water heater made in three longitudinal sections, the middle one being in detachable subsections and the opposite side sections being made fast to the sides of the cylinder as and for the purpose set forth.

In testimony whereof I affix my signature in presence of two witnesses.

ROBERT LOWE.

Witnesses:
HUGH A. ROGERS,
W. E. WOLFE.